United States Patent

Knowles

[15] 3,671,642
[45] June 20, 1972

[54] N-ACYLCYCLOHEXYLAMINE REPELLANTS AND METHODS OF USE

[72] Inventor: Richard N. Knowles, Hockessin, Del.

[73] Assignee: E. I. du Pont de Nemours and Company, Wilmington, Del.

[22] Filed: Oct. 24, 1968

[21] Appl. No.: 770,447

Related U.S. Application Data

[60] Division of Ser. No. 635,306, April 20, 1967, which is a continuation-in-part of Ser. No. 574,276, Aug. 18, 1966.

[52] U.S. Cl. ............................................................ 424/320
[51] Int. Cl. .................................... A01n 9/20, A01n 23/00
[58] Field of Search .......................................... 424/320, 324

[56] References Cited

FOREIGN PATENTS OR APPLICATIONS 782,789  10/1957  Austria .............................. 260/472 C Primary Examiner—Benjamin R. Padgett
Attorney—Herbert W. Larson

[57] ABSTRACT

Repelling animals with N-acylcyclohexylamines of the formula:

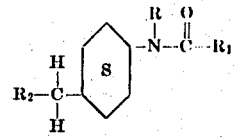

wherein
R is hydrogen, methyl, or ethyl;
$R_1$ is hydrogen or alkyl of one through four carbon atoms; and
$R_2$ is straight chain or branched alkyl of three through eight carbon atoms.
Typical is N-acetyl-cis-4-n-butylcyclohexylamine useful for repelling animals.

10 Claims, No Drawings

N-ACYLCYCLOHEXYLAMINE REPELLANTS AND METHODS OF USE

CROSS-REFERENCE

This application is a divisional of copending application Ser. No. 635,306, filed Apr. 20, 1967, which in turn is a continuation-in-part of my application Ser. No. 574,276, filed Aug. 18, 1966.

BACKGROUND OF THE INVENTION

Application Ser. No. 532,544, filed Mar. 1, 1966 relates to compounds containing cyclohexyl ring structures and having utility as animal repellants.

I have now discovered additional compounds containing a cyclohexyl ring structure and having utility as animal repellants.

SUMMARY OF THE INVENTION

This invention relates to N-acylcyclohexylamines.

More specifically, this invention refers to 4-acyl-4-higher alkyl-substituted-cyclohexylamines, compositions containing them and methods of applying them to animals.

Potent animal inhalation irritant effects are achieved by applying to animals or their habitat, compounds of the formula:

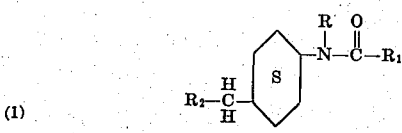

(1)

wherein
R is hydrogen, methyl, or ethyl;
$R_1$ is hydrogen or alkyl of one through four carbon atoms; and
$R_2$ is straight chain or branched alkyl of three through eight carbon atoms.

Substitutions on the cyclohexyl ring must be in the cis configuration to obtain optimum irritant effects.

Preferred because of animal irritant effects at low rates and good residual effects are N-formyl and N-acetyl-cis-4-higher alkyl-cyclohexylamines.

Utility

Compounds of this invention cause potent irritation to animal tissue, particularly to the mucous membranes.

Animals exposed to the above compounds show signs of severe respiratory irritation and are quickly incapacitated. These compounds have two advantages over currently used riot control agents such as ortho-chlorobenzylidene-malonitrile (CS) and 2-chloroacetophenone (CN). One, the compounds are more potent at low concentrations and tow, they provide residual activity over longer periods of time.

Compounds of this invention and particularly N-acetyl-cis-4-n-hexylcyclohexylamine and N-acetyl-cis-4-n-butyl-cyclohexylamine have potential use as riot control agents, dog repellants, deer repellants, rodent repellants and as contaminating agents for caves or underground tunnels.

Preparation

The compounds of this invention can be prepared by the following synthetic route:

R, $R_1$ and $R_2$ in the following reactions are as defined above in the formula (1).

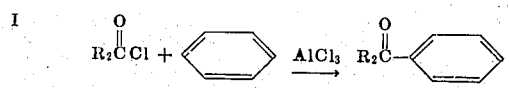

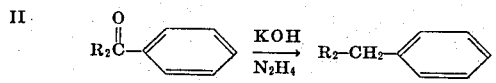

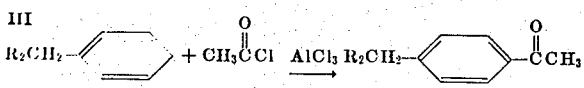

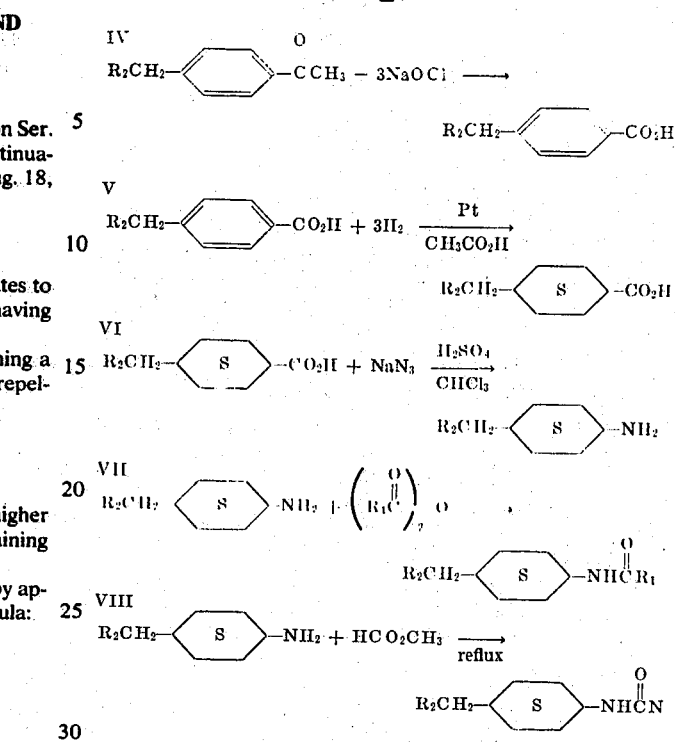

Those compounds where R is methyl or ethyl are prepared according to the following reactions where $R_1$ becomes R during reaction IX.

The Friedel-Crafts reaction (I) is run by carefully adding the acid chloride to a stirring mixture of aluminum chloride and benzene. A slight molar excess of catalyst is used; benzene serves as both a solvent and reactant. The acid chloride is added at such a rate so as to keep the temperature of the slurry at about 30°–40° C. The mixture is stirred for 1 additional hour after all of the acid chloride is added, and then water is slowly added to decompose the catalyst. Sufficient water is added so that all the solids are dissolved. The phenylalkyl ketone is isolated from the benzene solution and is purified by distillation.

The Wolff-Kishner reduction (II) is run in 2-(2-ethoxyethoxy)ethanol using a modification of the procedure given by J. Cason, et al. in *Organic Synthesis*, Collective Vol. IV, John Wiley and Sons, New York, (1963), p. 510. Once the reactants are mixed, they are heated to reflux for a period of 3 to 5 hours. The reflux temperature is generally in the 130°–140° C. range. After completion of the reflux period, the solution is cooled and poured into three to four volumes of water. The alkylbenzene product is extracted with pentane and purified by distillation.

The Friedel-Crafts reaction (II) is run by mixing approximately equimolar quantities of the reactants together in hexane or nitromethane at less than 5° C. The stirring mixture is slowly allowed to warm to room temperature, and when hydrogen chloride evolution subsides, the mixture is refluxed several hours. Water is then added slowly to decompose the catalyst. A sufficient quantity of water is then added so that all of the solids are dissolved. The desired acetophenone derivative is isolated from the organic phase, and purified by distillation. Gas-liquid chromatography on an F & M Model 500 Gas Chromatographer using a 2 feet × ¼ inch O.D. stainless steel column, containing 10 percent Carbowax 20M on 60–80 mesh Diatoport T indicates that about 98 percent of the acetophenone is the 1,4 isomer and 2 percent is the 1,2 isomer. The 1,2 isomer has the shorter retention time.

The haloform reaction (IV) is run by slowly adding a cold (<5° C.) sodium hypochlorite solution to a stirring solution of the acetophenone derivative in methanol. This is a modification of the procedure used by E. E. Royals (J. Am. Chem. Soc., 69, 841 (1947) for the haloform reaction of α-ionone. After the sodium hypochlorite solution is added, the mixture is warmed to room temperature, and left standing overnight. Thereafter, the mixture is heated to reflux, and the distillate collected until the pot temperature rises to 95°–97° C.; most of the methanol is distilled. The pot is then cooled to room temperature. In those reactions where $R_2$ has a low molecular weight such as n-butyl- the sodium benzoate derivative remains dissolved; however, when $R_2$ becomes larger such as n-heptyl-, the sodium benzoate derivative precipitates as a soapy solid. Sulfur dioxide is bubbled into the alkaline pot concentrate until the pH drops below 3. The precipitated benzoic acid derivative is either filtered and washed with water, or extracted with methylene chloride depending on whether or not the benzoic acid is easily filterable or is of a soapy nature. Some of these benzoic acid derivatives can be recrystallized from acetonitrile or pentane, and some are purified merely by trituration with cold pentane.

The catalytic hydrogenation (V) is performed at 2 to 3 atmospheres of hydrogen using platinum oxide as catalyst and glacial acetic acid as solvent. A Parr Hydrogenation Apparatus is suitable for these reactions. This reaction produces a cis/trans isomer mixture of about 2 or 3/1. The cis and trans designation refers to the relationship of the 4-alkyl substituent and carboxylic acid group on the cyclohexane ring, this is illustrated below

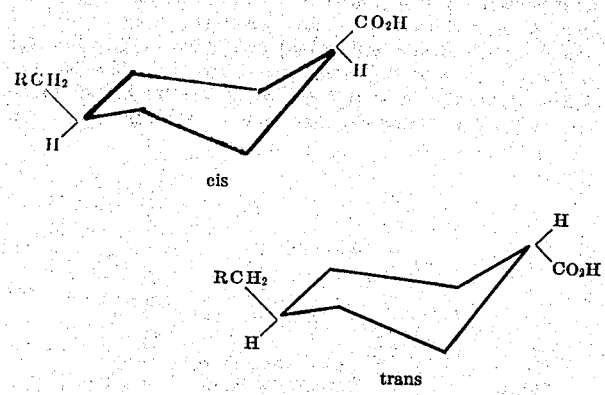

The Schmidt reaction (VI) is performed by dissolving the cyclohexane carboxylic acid derivative in a mixture of chloroform and concentrated sulfuric acid. Sodium azide is then added in small portions to the stirring mixture at a rate sufficient to keep the reaction temperature between 35° and 45° C. The mixture is stirred at about 45° to 50° C. until the bubbling nearly stops (1 to 3 hours). The mixture is then transferred to a separatory funnel, and the lower, gelatinous sulfuric acid layer is slowly dripped onto ice. The amine sulfate precipitates as a soapy material which slowly crystallizes. The chloroform should be kept away from the ice water mixture since it makes the work-up much more difficult. Those amines which crystallize as the hemi-sulfates or sulfates are filtered and washed with water. It is convenient to store these amines as their salts. Those amine salts which fail to crystallize are converted to the free bases by making the sulfuric acid solution alkaline, and extracting the amine with dichloromethane. The amine is then purified by distillation. The Schmidt reaction proceeds without changing the cis/trans product ratio.

The acylation (VII) can be performed by dissolving the free amine in an equal volume of dimethyl-acetamide (DMAC) or dimethylformamide (DMF) and adding an excess of the desired acid anhydride to the stirring solution. This reaction is very exothermic. The solution is stirred for 10 minutes, and then it is poured into 10 to 100 volumes of water. The amide separates as an oil which subsequently crystallizes.

The acylation (VII) can also be performed using the amine sulfate directly according to the following procedure. The amine sulfate is ground into a powder, and added to a 1:1 mixture of DMAC and 20 percent aqueous sodium hydroxide solution; there should be a large excess of base. The mixture is stirred for 10 to 15 minutes, and then an excess of the desired acid anhydride is added. The mixture warms to about 60° to 65° C. The sulfate entirely dissolves in 10 to 20 minutes. The solution is then poured into 10 to 100 volumes of water. The amide is isolated by the usual procedures given above.

The formamides of reaction VIII are prepared by refluxing the amine with methylformate for several hours. The excess methylformate is stripped from the reaction, and the residual formamide is purified by recrystallization.

These acylations proceed without changing the cis/trans product ratio.

In those cases where R is methyl, or ethyl, the formamide or acetamide respectively is reduced by lithium aluminum hydride in refluxing ether according to reaction IX. The amine is isolated from the reaction after the lithium aluminum hydride is destroyed. These amines are purified by distillation.

Reactions X and XI are run according to the procedures described for reactions VII and VIII respectively.

An alternative synthesis route can be used when the appropriately substituted aniline derivatives are available. This route is illustrated below.

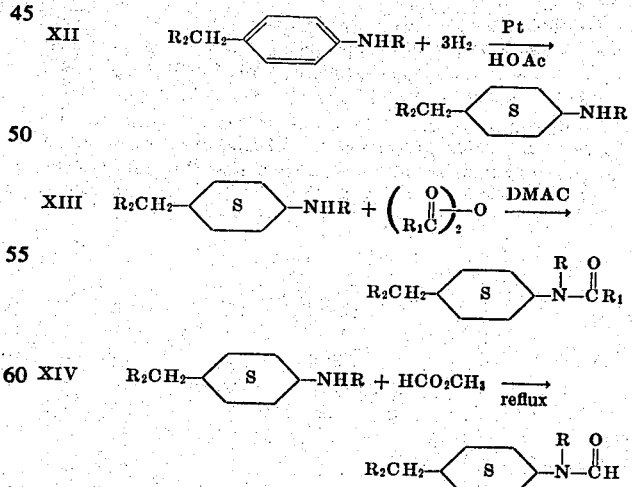

The hydrogenation (XII) can be performed at 1 to 3 atmospheres of hydrogen on a Parr Hydrogenation Apparatus using platinum oxide as catalyst and glacial acetic acid as solvent. Hydrogen up-take is quite slow.

The cis/trans ratio of the cyclohexylamine product is about 1:1.

Reactions XIII and XIV are performed according to reactions VII and VIII discussed above. The cis/trans ratio for the amides from XII and XIII is about 1:1.

The amides from reactions VII, VIII, X, XI, XIII, and XIV can be used for the purposes of this invention without separation of the cis and trans isomers. However, if desired, the pure amide isomers can be separated by chromatography over silicic acid using methylcyclohexane saturated with acetonitrile as the eluting solvent. Isomer mixtures also can be separated by gas-liquid chromatography using 10 percent Carbowax 20M on 60-80 mesh Diatoport T. In both of these chromatography methods, the cis isomer elutes before the trans isomer.

Compositions

Compounds of this invention can be administered alone, but are generally contained in a composition with an inert diluent non toxic to animals. The diluent selected depends on the route of administration.

Emulsifying agents can be used with the diluent and compound of formula (I) to aid in dispersion of the active ingredient. Emulsifying agents that could be used include alkylaryl polyethoxy alcohols, alkyl and alkylaryl polyether alcohols, polyoxyethylene sorbitol or sorbitan fatty esters, polyethylene glycol fatty esters, fatty alkylol amide condensates, amine salts of fatty alcohol sulfates plus long chain alcohols and oil soluble petroleum sulfonates.

The amount of emulsifying agent in the composition will range from 0.1 to 20 percent by weight.

Since the compounds of the present invention would generally be administered by vapor or spray application, the compositions will contain a liquid diluent such as water, acetone, hexane, gasoline, kerosene, other hydrocarbon oils, alcohols or other liquids generally used in pharmaceutical preparations.

The amount of active ingredient in the composition will vary from 0.005 percent by weight to 95 percent or even higher. However, the diluent will generally constitute the major proportion of the composition and the amount of active ingredient will be less than 50 percent by weight. The exact concentration of the active ingredient will depend on the mechanism used for administration and will be easily understood by one knowledgeable in pharmaceutical application rates.

Application

A quantity of active ingredient sufficient to cause irritation to animal tissue is 1 to 4,000 micrograms per liter of air at exposure of 1 minute. A rate of 5 to 4,000 micrograms per liter of air at exposure of 1 minute is preferred. Rates of over 4,500 micrograms per liter of air at exposure of 5 minutes kills 50 percent of the mice which are treated.

The following additional examples are provided to more clearly illustrate the invention.

EXAMPLE 1

A 23.9 gram quantity of 4-n-butylaniline (from Aldrich Chemical Company) is dissolved in 250 milliliters of glacial acetic acid, and 1 gram of Adam's Catalyst (PtO₂) is added. The mixture is then hydrogenated at two to three atmospheres using a Parr Hydrogenation Apparatus. To insure complete reduction, the hydrogenation is run over night. The catalyst is then filtered, and the acetic acid is removed under reduced pressure on a steam bath. The concentrate is taken up in ether and washed with dilute, aqueous sodium bicarbonate. The ethereal solution is dried (MgSO₄), filtered and evaporated in vacuum leaving 21 grams of the 4-n-butylcyclohexylamine ($n_D^{25}$ 1.4574). The amine is taken up in two volumes of dimethylacetamide and treated with one volume of acetic anhydride. The temperature of the stirring solution rises rapidly to 60°-80° C. After having stirred for 10 minutes, the solution is poured into 10 volumes of water. The oil which separates is extracted with ether. The ethereal solution is dried (MgSO₄), filtered and stripped leaving an oil which slowly crystallizes. This waxy solid softens at 57° C. and melts from 79°-100° C. Gas-liquid chromatography of this cis/trans mixture of N-acetyl-4-n-butylcyclohexylamine on an F & M Model 500 Gas Chromatograph over 10 percent Carbowax 20M on 60-80 mesh Diatoport T in a ¼ inch × 2 feet stainless steel column at a temperature of 200° C., a block temperature of 308° C., and an injection port temperature of 280° C. with a He flow rate of 60 cc./min. shows that the cis:trans ratio is about 1:1.

The retention times for the cis and trans isomers are 28.0 and 32.5 minutes respectively. The cis isomer causes severe burning of the operator's nose as it elutes from the column while the trans isomer does not cause much irritation.

The infra-red spectrum (nujol) for this mixture shows characteristic peaks at 3,300 cm⁻¹ for the N-H, 1,630 and 1,560 cm⁻¹ for the amide carbonyl, 1,320 cm⁻¹ for the trans isomer and 1,280 cm⁻¹ for the cis isomer.

Anal. Calc'd. for $C_{12}H_{23}NO$:
C, 73.0; H, 11.8; N, 7.1%
Found: C, 72.9; H, 11.7; N, 6.7%

Mice are treated by aerosol exposure to the cis/trans mixture of N-acetyl-4-n-butylcyclohexylamine in the following manner: The compound is administered as an aerosol into a 2.8 liter chamber. The exposure chamber consists of a 2.8 liter bell jar over a nebulizer inserted through the floor of the chamber. Mice are exposed for 5 minutes to 200.0 micrograms per liter (1,000Ct). The compound is dissolved in 1.4 ml. of acetone and during a span of 20 seconds the compound is sprayed up into the chamber. No further air is transferred into or out of the chamber during the 5-minute exposure.

After this exposure, irritant effects are observed in all mice exposed. The mice used as controls exposed to 1.4 ml. of acetone alone exhibit no irritant effects. Irritant effects can be described as the presence of one or more of the following reactive signs:

a. hyperemia of the ears, nose and tail
b. abnormal gait, including rubbing of the nose on the floor while running about
c. blinking
d. salivation
e. depression
f. dyspnea
g. hunched posture
h. face-pawing.

EXAMPLE 2

In those instances where the desired amine is not reported in the literature, the following synthesis procedure can be used. The synthesis of 4-n-heptylaniline will be used for the purpose of illustration.

N-acetyl-4-n-heptanoylaniline is prepared from acetanilide and n-heptanoyl chloride in carbon disulfide with aluminum chloride as catalyst, according to the procedure of F. Kunckell, Chem. Ber., 33, 2641 (1900).

The N-acetyl-4-n-heptanoylaniline (24.7 grams; 0.1 mole) and 20 milliliters of 99 percent hydrazine hydrate are added to a solution of 40 grams of potassium hydroxide in 150 milliliters of diethyleneglycolmonoethylether. This procedure is similar to that given by J. Cason et al., in Organic Syntheses, Collective Volume IV, p. 510. The reactants are heated for 1 hour at 120°-130° C. The distillate is collected until the temperature reaches 200°-210° C. The reactants are heated for an additional 2 hours, and the solution is then poured into 500 milliliters of ice water. The 4-n-heptylaniline is extracted from alkaline solution and purified by distillation. This aniline derivative can then be reduced and acylated according to the procedure in Example 1.

The following aniline derivatives also can be prepared according to this procedure using like amounts by weight of the following materials for the N-acetyl-4-n-heptanoylaniline used above.

| Starting Material | Produced |
| --- | --- |
| N-acetyl-4-n-hexanoylaniline | 4-n-hexylaniline |
| N-acetyl-4-iso-butanoylaniline | 4-iso-butylaniline |
| N-acetyl-4-(3-methylpentanoyl)-aniline | 4-(3-methylpentyl)-aniline |

EXAMPLES 3–14

The following compounds can be prepared according to the procedures used in Examples 1 and 2 and are substituted one at a time in like amount by weight for the N-acetyl-4-n-butylcyclohexylamine used in Example 1. Like results are obtained. Cis/trans mixtures need not be separated; the active component is the cis isomer.

3. N-Butyryl-4-n-butylcyclohexylamine.
4. N-Formyl-4-iso-butylcyclohexylamine.
5. N-acetyl-4-n-hexylcyclohexylamine.
6. N-Formyl-4-(3,5-dimethylhexyl)cyclohexylamine.
7. N-Butyryl-4-n-octylcyclohexylamine.
8. N-Acetyl-4-(3-methylpentyl)cyclohexylamine.
9. N-Methyl-N-acetyl-4-n-heptylcyclohexylamine.
10. N-Ethyl-N-formyl-4-n-butylcyclohexylamine.
11. N-Acetyl-4-n-octylcyclohexylamine.
12. N-Ethyl-N-acetyl-4-n-pentylcyclohexylamine.
13. N-Acetyl-4-(5-methylheptyl)cyclohexylamine.

EXAMPLE 14

Dogs are exposed to vapors from a 2/1 cis/trans mixture of N-acetyl-4-n-butylcyclohexylamine in acetone spotted on a 6 cm. circle of filter paper. The dog's head is held by an operator, and the dried paper is held 6 to 12 cm. from the muzzle. Within 10–30 seconds, the dog salivates, licks his lips, and occasionally face-paws. Generally, he struggles to escape further irritant effects. As little as 2 milligrams on paper can generate enough vapor at room temperature to cause visible discomfort in most dogs.

EXAMPLE 15

A test chamber, comprising a plastic rectangular box of 65 liters, is filled with an aerosol spray of a 2/1 cis/trans mixture of N-acetyl-4-n-butylcyclohexylamine. The spray is administered 2 cm. above an immobilized rabbit, and 3 cm. distant from the end of the nose. The aerosol is aimed directly at the rabbit. Administration of compound takes approximately one minute. At 5,000 CT (5 minutes), the rabbit exhibited lacrimation, nasal exudate, face pawing, and constant head shaking. After several minutes, the eyes became static after periods of blinking. Dyspnea continued for 2 hours after exposure.

The cis isomer of Examples 14 and 15 is separated from the cis/trans mixture by chromatography over silicic acid using chloroform as eluant. The weight ratio of silicic acid to cis/trans compound is 50:1.

EXAMPLE 16

A 2 percent solution of N-acetyl-4-n-hexylcyclohexyl-amine in dichloromethane is dispersed into and through a chamber containing the test animals described below. This aerosol is generated by feeding the solution of test compound through a commercial paint sprayer jet at a rate of 10 ml./minute and dispersing the spray with a stream of air having a flow rate of 44 liters/minute supplied at a pressure of 62 psi. The efficiency of forming respirable particles ranges from 10 to 40 percent. This aerosol gives a chamber concentration of 2.1 ml./liter; the particles have a mass median diameter of 1.6 microns with a standard geometric deviation of 2.0 microns.

After having been exposed to this aerosol for 1 minute young, adult, male guinea pigs weighing from 250–300 grams display salivation for 1 hour and in some instances prostration for 20 to 60 minutes.

After rats weighing about 200 grams are exposed to this aerosol for 1 minute, lacrimation is observed which lasts for about 30 minutes.

After gerbils are exposed to this aerosol for 1 minute, shovelnosing is observed which lasts for about 30 minutes. Shovelnosing is a type of behavior exhibited by the animal in which the animal runs around the cage rubbing the side of its face against the floor with a wiping motion.

I claim:

1. Method of repelling animals comprising applying to an area to be protected from animals in an amount sufficient to cause irritation to animal tissue, a compound of the formula:

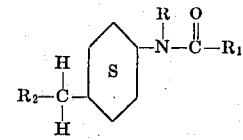

wherein
R is selected from the group consisting of hydrogen and alkyl of one through two carbon atoms;
$R_1$ is selected from the group consisting of hydrogen and alkyl of one through four carbon atoms;
$R_2$ is alkyl of three through eight carbon atoms.

2. Method of repelling animals according to claim 1 wherein R is hydrogen and the compound applied.
3. Method of repelling animals according to claim 1 wherein R is methyl in the compound applied.
4. Method of repelling animals according to claim 1 wherein $R_1$ is hydrogen in the compound applied.
5. Method of repelling animals according to claim 1 wherein $R_2$ is propyl in the compound applied.
6. Method of repelling animals according to claim 1 wherein $R_2$ is pentyl in the compound applied.
7. Method of repelling animals comprising applying to an area to be protected from animals in an amount sufficient to cause irritation to animal tissue, N-formyl-cis-4-n-hexyl-cyclohexylamine.
8. Method of repelling animals comprising applying to an area to be protected from animals in an amount sufficient to cause irritation to animal tissue, N-acetyl-cis-4-n-hexyl-cyclohexylamine.
9. Method of repelling animals comprising applying to an area to be protected from animals in an amount sufficient to cause irritation to animal tissue, N-acetyl-cis-4-n-butyl-cyclohexylamine.
10. An animal irritant composition comprising a major amount of an inert diluent non-toxic to animals and an amount sufficient to cause irritation to animal tissue of a compound of the formula:

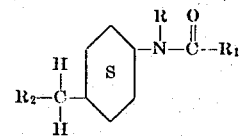

wherein
R is selected from the group consisting of hydrogen and alkyl of one through two carbon atoms;
$R_1$ is selected from the group consisting of hydrogen and alkyl of one through four carbon atoms;
$R_2$ is alkyl of three through eight carbon atoms.

* * * * *